US006708085B2

(12) United States Patent
Yamane et al.

(10) Patent No.: US 6,708,085 B2
(45) Date of Patent: Mar. 16, 2004

(54) PROBE CAR CONTROL METHOD AND TRAFFIC CONTROL SYSTEM

(75) Inventors: Kenichiro Yamane, Hitachi (JP); Takayoshi Yokota, Hitachiota (JP); Takumi Fushiki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,513

(22) Filed: Feb. 27, 2001

(65) Prior Publication Data

US 2002/0059017 A1 May 16, 2002

(30) Foreign Application Priority Data

Oct. 16, 2000 (JP) ....................................... 2000-319606

(51) Int. Cl.[7] .................................................. G06F 7/00

(52) U.S. Cl. ........................... 701/1; 701/117; 701/118; 701/200; 340/905

(58) Field of Search ............................ 701/1, 117, 118, 701/200, 207, 208, 213; 340/905, 988, 989, 990, 991, 993

(56) References Cited

U.S. PATENT DOCUMENTS 5,483,446 A * 1/1996 Momose et al. ............... 701/1
5,483,450 A * 1/1996 Titli et al. .................... 180/41
5,539,645 A * 7/1996 Mandhyan et al. ......... 340/905
6,076,032 A * 6/2000 Kuroda et al. ................ 477/97
6,129,025 A * 10/2000 Minakami et al. .......... 104/288
6,161,071 A * 12/2000 Shuman et al. ............. 340/436
6,182,000 B1 * 1/2001 Ohta et al. .................. 180/170
6,199,001 B1 * 3/2001 Ohta et al. .................. 701/208
6,226,591 B1 * 5/2001 Okumura et al. ........... 701/207
6,263,276 B1 * 7/2001 Yokoyama et al. ......... 701/207
6,292,719 B1 * 9/2001 Seto et al. .................. 340/435
6,311,122 B1 * 10/2001 Higashimata ................ 701/96
6,317,686 B1 * 11/2001 Ran ........................... 701/117
6,334,086 B1 * 12/2001 Park et al. .................. 340/905
6,405,132 B1 * 6/2002 Breed et al. ................ 701/301
6,424,888 B1 * 7/2002 Sone et al. .................... 701/1
6,487,500 B2 * 11/2002 Lemelson et al. .......... 701/301
6,519,514 B2 * 2/2003 Mizutani ..................... 701/23

* cited by examiner

*Primary Examiner*—William A. Cuchlinski, Jr.
*Assistant Examiner*—Olga Hernandez
(74) *Attorney, Agent, or Firm*—Antonelli, Terry, Stout & Kraus, LLP

(57) ABSTRACT

It is possible to control a car group having a probe car at the head thereof or a whole traffic flow including the car group, with due regard to the efficiency, safety and environment. A probe car system includes a device for inputting a control strategy and/or a car group strategy, based on a road map database or traffic data; a device for evaluating propriety of the strategy and determining a proper strategy; and a device for transmitting the proper strategy to the probe car.

10 Claims, 14 Drawing Sheets

| TIME | BASE STATION ID | CAR ID | POSITION (EAST LONGITUDE) | POSITION (NORTH LATITUDE) | SPEED | CAR KIND | WEATHER | ---- |
|---|---|---|---|---|---|---|---|---|
| 10:03:25 | 123 | 123456 | 140.36.13 | 36.30.20 | 46 | SMALL SIZE | RAIN | ---- |
| 10:04:10 | 321 | 234567 | 140.31.20 | 36.11.11 | 7 | LARGE SIZE | CLEAR | ---- |
| 10:04:12 | 234 | 345678 | 139.58.50 | 35.40.45 | 15 | MEDIUM SIZE | CLEAR | ---- |
| ⋮ | ⋮ | ⋮ | ⋮ | ⋮ | ⋮ | ⋮ | ⋮ | ⋮ |

| TIME | SENSOR 1 | | | SENSOR 2 | | | ··· |
|---|---|---|---|---|---|---|---|
| | VOLUME OF TRAFFIC | OCCUPATION FACTOR | AVERAGE SPEED | VOLUME OF TRAFFIC | OCCUPATION FACTOR | AVERAGE SPEED | ··· |
| 10:00~10:05 | 50 | 25 | 13 | 81 | 21 | 25 | ··· |
| 10:05~10:10 | 56 | 30 | 12 | 73 | 29 | 17 | ··· |
| 10:10~10:15 | 61 | 22 | 18 | 66 | 32 | 14 | ··· |
| 10:15~10:20 | 51 | 12 | 28 | 59 | 34 | 11 | ··· |
| ⋮ | ⋮ | ⋮ | ⋮ | ⋮ | ⋮ | ⋮ | |

| STEP NUMBER | 1 | 2 | 3 | 4 | 5 | 6 | 7 | 8 | 9 | 10 |
|---|---|---|---|---|---|---|---|---|---|---|
| 51 | GREEN | GREEN FLASHING | RED | RED | RED | RED | RED | RED | RED | RED |
| 52 | GREEN | GREEN | GREEN | YELLOW | RED | RED | RED | RED | RED | RED |
| 53 | RED | RED | RED | RED | RED | GREEN | GREEN FLASHING | RED | RED | RED |
| 54 | RED | RED | RED | RED | RED | GREEN | GREEN | GREEN | YELLOW | RED |
| DURATION IN SECONDS | 47 | 5 | 2 | 4 | 2 | 28 | 5 | 2 | 3 | 2 |
| START TIME | 9:31:00 | 9:31:47 | 9:31:52 | 9:31:54 | 9:3158 | 9:32:00 | 9:32:28 | 9:32:33 | 9:32:35 | 9:32:38 |

PROBE CAR CONTROL METHOD AND TRAFFIC CONTROL SYSTEM

BACKGROUND OF THE INVENTION

The present invention relates to a method, and apparatus, for controlling the behavior of cars, and a traffic control system using the control method. In particular, the present invention relates to means for controlling car groups or the overall traffic flow including the car groups.

As a conventional technique for controlling cars traveling on a road by taking the efficiency, safety and environment into consideration, there is a traffic control system for controlling signals described in "Traffic Engineering," edited and written by Iida, published by Kokumin Kagaku Sha in 1992, pp. 245–256.

In that system, complicated cars are separated as far as possible and signal waiting is reduced by controlling indications of signals and control parameters (cycle length, split, and offset). Especially, in system control for controlling timing of a plurality of signal groups disposed along a route, signal offset is determined by suitably designing a time width (through band) during which a traveling car can pass continuously without being stopped by a red light, as shown in FIG. 2.

As a different conventional technique for controlling traveling cars, there is an automatic driving control technique for suitably controlling the car speed and so on, on the basis of communication information from a road and communication information between cars, as described in "ITS" edited by Asahi Shinbunsha and Asahi Original, published in 1998, pp. 42–47.

In the above described conventional signal control technique, traveling cars are controlled signals. In a road section other than signal intersections, control of traveling cars is difficult. For example, therefore, the traveling cars travel in a way remarkably different from hypothesis made when determining the offset of the signals. In this way, completely free traveling is possible. If cars conduct unnecessary acceleration and stop, therefore, smoothness and efficiency of the traffic flow are hampered. In addition, the hampered smoothness sometimes exerts bad influences upon the safety and environment.

Furthermore, in the conventional automatic driving control technique, the car control becomes difficult if there are automatically driven cars and ordinary cars are mixedly present on the same lane.

SUMMARY OF THE INVENTION

Therefore, an object of the present invention is to control traveling cars efficiently even on a simple road section other than signal intersections by setting probe cars which lead traveling cars and suitably controlling the probe cars.

Another object of the present invention is to provide a traffic control system for controlling car groups each having a probe car at the head thereof or the overall traffic flow including the car groups by suitably controlling the probe cars.

Still another object of the present invention is to conduct signal control so as not to divide a car group having a probe car at the head thereof by a red light.

Yet another object of the present invention is to provide such an operational form of a traffic control system that drivers of probe cars are supplied with an incentive according to the driver's degree of contribution and persons participating in the benefits of the probe cars cast a burden according to the degree.

The above described objects are achieved by a probe car control method for controlling behavior of cars, including the steps of: inputting a control strategy concerning behavior of a probe car and/or a car group concerning behavior of a car group having a probe car at head thereof, on the basis of a road map database or traffic data collected in real time; evaluating propriety of the strategy; and transmitting a proper strategy to the probe car to control the probe car. Or the above described objects are achieved by a storage medium storing a program for executing the probe car control method.

The probe car control according to the present invention includes a road map database; a car group control strategy input section for inputting a control strategy concerning behavior of a probe car and/or a car group strategy concerning behavior of a car group having a probe car at head thereof, based on a road map database or traffic data collected in real time; a car group control strategy evaluating and determining section for evaluating propriety of the strategy and determining a proper strategy; and a car group control strategy transmission section for transmitting the proper strategy to the probe car.

As the control strategy of the probe car inputted by the car group control strategy input section, the following can be mentioned. The control strategy indicates an index concerning a speed such as a desired speed of the probe car and/or an index concerning steering operation such as a lane change. In a place where the driver lowers the traveling speed, such as a tunnel, a tollgate, a gate, fog, or road freezing, the control strategy is to set a desired speed before entering the place is lower than the current speed or a recommended speed of the place. In a place where the traveling speed is physically lowered, such as a sag or climbing section, the control strategy is to set a desired speed before entering the place is higher than the current speed or a recommended speed of the place. Or on a multilane road having two or more lanes for each way, the control strategy indicates that probe cars are disposed on all lanes and probe cars on respective lanes are made to travel in parallel.

In accordance with a different aspect of the probe car control apparatus, the car group strategy of the probe car inputted by the car group control strategy input section is forming car groups by disposing probe cars in suitable positions based on traffic data; canceling a car group by making a probe car leave a car group or making a probe car an ordinary car; or integrate car groups into one car group by controlling probe cars leading a plurality of car groups. In accordance with a different aspect of the probe car control apparatus, a method for disposing probe cars in the control strategy or car group strategy of probe cars inputted by the car group control strategy input section is: a method of selecting suitable cars as probe cars from among traveling ordinary cars, based on traffic data; or a method of previously disposing cars dedicated cars to be used as probe cars, selecting probe cars to be squeezed between ordinary cars, and selecting positions and methods of squeezing.

In accordance with a different aspect of the probe car control apparatus, subject cars of the control strategy or car group strategy of probe cars inputted by the car group control strategy input section are all cars traveling on a subject section.

In accordance with a different aspect of the probe car control apparatus, indices used in an evaluation function for evaluating propriety of the strategy in the car group control strategy evaluating and determining section includes: travel time (average speed), traffic jam length, a number of times of stop, and variation of speed (standard deviation), serving as indices concerning efficiency; the number of times of rapid deceleration occurrence, the number of times abnormal approach between cars, the number of times of crashes, and stability of a traffic flow at the time of following movement (local stability/asymptotic stability), serving as indices concerning safety; or exhaust volume of matters determined by the Environmental Pollution Prevention Act and the Air Pollution Control Act, such as hydrocarbon (HC), carbon monoxide (CO), nitrogen oxide (NOx), lead compounds, particulate matters, acoustic power level of road traffic noise, exhaust volume of carbon dioxide, fuel consumption, and road traffic vibration, serving as indices concerning environment.

A probe car control apparatus which achieves the above described objects may be a probe car control apparatus including a map database; a car group strategy input section for inputting signal indication schedule data so as not to divide a car group having a probe car at head thereof by a red light, based on the database or traffic data collected in real time; and a car group control strategy evaluating and determining section for evaluating propriety of the signal indication schedule data and determining proper signal indication schedule data.

In accordance with a different aspect of the probe car control apparatus, the car group control strategy evaluating and determining section includes a traffic simulator for evaluating propriety of the strategy.

In accordance with a different aspect of the probe car control apparatus, the traffic data includes: car traveling data transmitted from an in-vehicle terminal having a transmission function via radio communication means such as a beacon on a road or a base station of portable telephone or PHS; fixed point passing traffic data measured by a car sensor on a road; road image processing data measured by an image sensor; or indication schedule data of intersection signals.

In order to achieve the above described objects, in a traffic control system according to the present invention includes: a traffic data storage for collecting and storing traffic data in real time; the above described probe car control apparatus; and a radio communication section serving as intermediation means for coupling an in-vehicle terminal, the probe car control apparatus, and the traffic data storage, or an intersection signal by using radio communication, a car group having a probe car at head thereof or a whole traffic flow including the car group is controlled by controlling a probe car having the in-vehicle terminal.

In accordance with a different aspect of the traffic control system, there is provided such an operational form that some incentive is given to drivers of probe cars depending upon the degree of contribution, and persons who benefit from the probe cars bear the expense.

In order to achieve the above described objects, a traffic control system according to the present invention includes: a traffic data storage for collecting and storing traffic data in real time; and a probe car control apparatus according to claim 11; a signal control device for controlling indication of a signal; and a signal. A a car group having a probe car at head thereof or a whole traffic flow including the car group is controlled by controlling an intersection signal so as not to divide a car group having a probe car at head thereof by a red light.

DETAILED DESCRIPTION OF THE EMBODIMENTS

Figure 1:
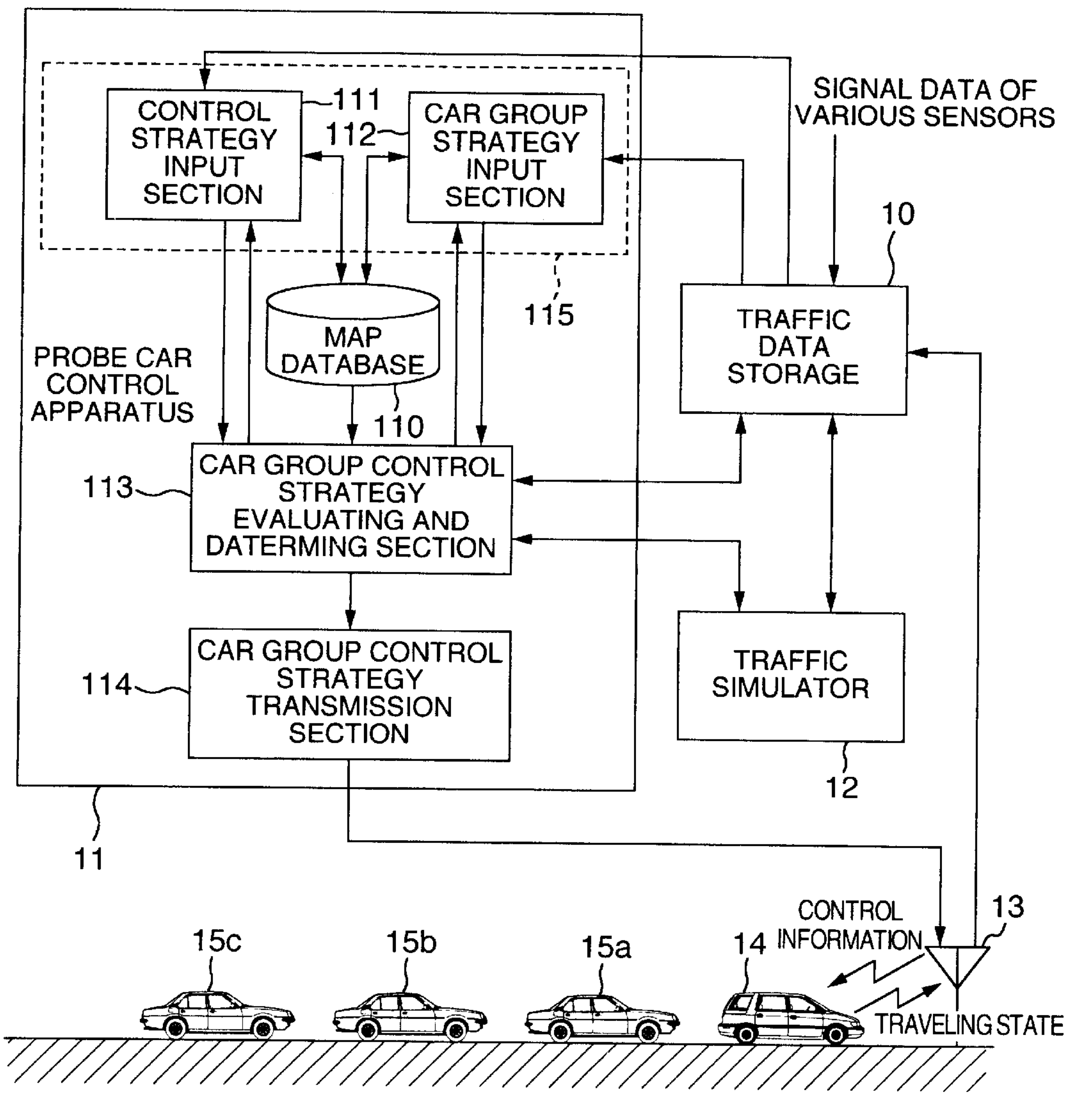
FIG. 1 is a block diagram showing an embodiment of a traffic control system having a probe car control apparatus according to the present invention.

Hereafter, embodiments of a probe car control method, a probe car control apparatus, and a traffic control system using the probe car control method will be described by referring to the drawing. FIG. 1 is a block diagram showing an embodiment of a traffic control system having a probe car control apparatus 11 according to the present invention. A traffic control system of the present embodiment includes a traffic data storage 10, a probe car control apparatus 11 according to the present invention, a traffic simulator 12, radio communication means 13, a probe car 14, and following cars 15. The probe car control apparatus 11 includes a map database 110, a car group control strategy input section 115, a car group control strategy evaluating and determining section 113, and a car group control strategy transmission section 114. The car group control strategy input section 115 includes a control strategy input section 111 and/or a car group strategy input section 112.

Figures 2, 3:
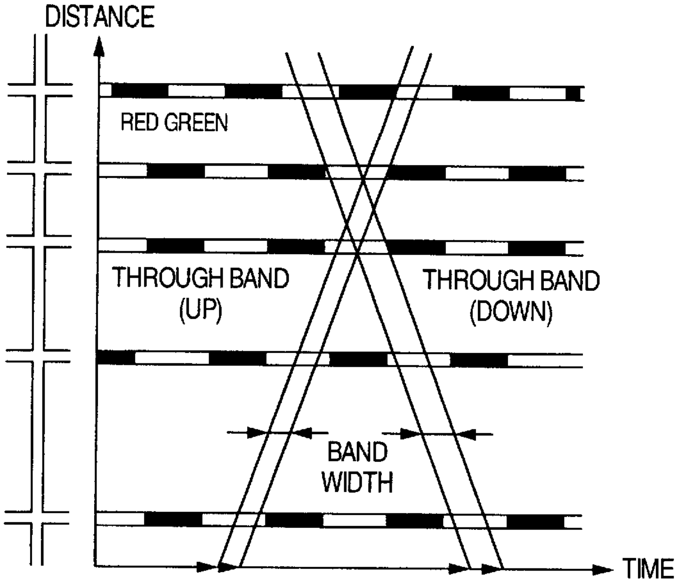
FIG. 2 is a diagram showing an example of a signal system control which is a conventional traffic control technique.
FIG. 3 is a table showing car traveling data transmitted from an in-vehicle terminal.

The traffic data storage 10 stores statistical data based upon traffic data collected in real time or traffic data collected in the past. As an example of collected traffic data, there is car traveling data transmitted from an in-vehicle terminal having a transmission function and received via the radio communication means 13 such as a beacon on a road or a base station of portable telephone or PHS. FIG. 3 shows an example of car traveling data transmitted from the in-vehicle terminal and received by the radio communication means 13. The car traveling data is administered by using received time and an ID of a base station. The car traveling data includes traveling information of the own car such as a car ID of the traveling car, a traveling position (latitude and longitude), a car speed, and a car kind. The car traveling data may further include various kinds of information such as phenomena around the own car like the weather. By the way, the in-vehicle terminal for collecting and transmitting the car traveling data will be described later in description of the probe car 14 as well.

Figures 4, 5:
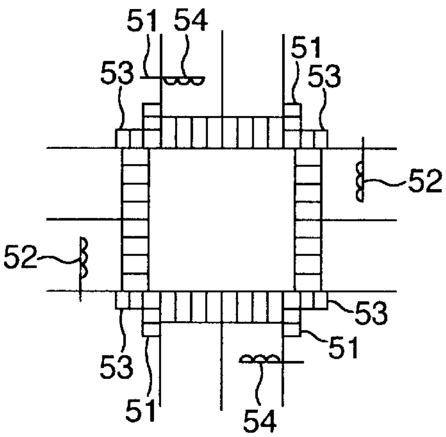
FIG. 4 is a diagram showing fixed point passing traffic data measured by a car sensor.
FIG. 5 is a diagram showing an intersection having a signal.

Other traffic data collected by the traffic data storage 10 may be fixed point passing traffic data measured by a car sensor on a road, or road image processing data of traffic jams and accidents measured by an image sensor located in the sky such as in an artificial satellite. FIG. 4 shows an example of the fixed point traffic data measured by a car sensor. The car sensor is a device for measuring a volume of traffic per unit time, an occupation factor, an average speed, and so on. Finer measurements with a higher real time property may be conducted by shortening a period of the measurement (five minutes in the example of FIG. 4. Furthermore, the period of the measurement may also be set to passage of each car, and thereby the passage speed of each car can be measured.

Figures 6, 7:
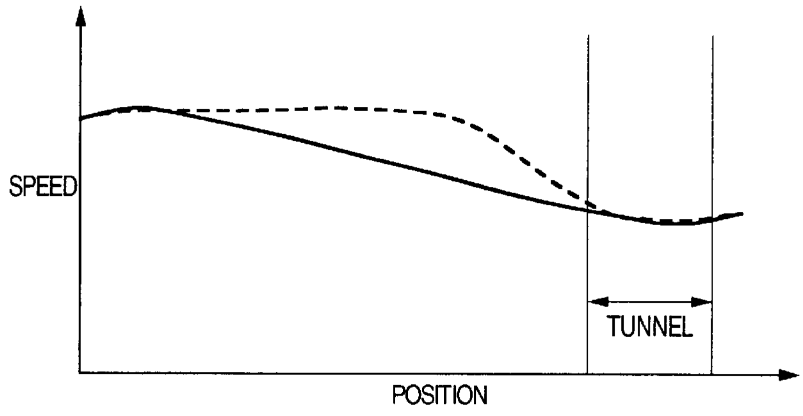
FIG. 6 is a table showing time series indication schedule data corresponding to the signal of FIG. 5.
FIG. 7 is a diagram showing a traveling locus of a car passing through a tunnel.

Other collected traffic data may be time series indication schedule data of signals in the near future subsequent to the present time. The time series indication schedule data is obtained from an intersection signal, or a signal control device which is a high rank device. FIG. 5 is a diagram showing an intersection having a signal. Numerals 51 and 53 denote pedestrian signals for respective directions. Numerals 52 and 54 denote car signals for respective directions. FIG. 6 is a table showing an example of time series indication schedule data. For each of the signals 51 to 54, signal indications for steps 1 to 10 are set. For each of steps, start time and duration in seconds are set.

As described above, the probe car control apparatus 11 includes the map database 110, the control strategy input section 111, the car group strategy input section 112, the car group control strategy evaluating and determining section 113, and the car group control strategy transmission section 114. The probe car control apparatus 11 has a function of determining a control strategy for suitably controlling probe cars or a strategy for forming car groups on the basis of real time information of the traffic data storage 10 and transmitting the determined strategy to the probe car 14.

Each of the components included in the probe car control apparatus 11 will now be described in detail. The map database 110 is a database having an electronic road map. For example, road points are defined as nodes. A section between nodes is defined as a link to represent a road section. The map database 110 stores information used on the computer as a road map. In other words, the map database 110 stores linear structures of a road such as node coordinates, link lengths and link connection relations, tunnels, tollgates, sags (valleys formed by connecting a down grade to an uphill grade), intersections, road structures such as signals, and link attributes. The map database 110 is electronic data. By using the map database 110 together with program software on the computer, therefore, the retrieval speed is increased and data access is facilitated.

The control strategy input section 111 serves to input a control strategy concerning the behavior of the probe car 14. On the basis of data of the traffic data storage 10 or the map database 110, the control strategy input section 111 may select a control strategy from among a plurality of preset control strategies and input it. Or by using a man-machine interface or the like, the user may suitably input a control strategy manually. As an example of an index of a control strategy, there is an index concerning a desired speed of the probe car. For example, in the case where it is known on the basis of data of the traffic data storage 10 that there is a traffic jam ahead of the probe car, a low desired speed is indicated beforehand as the desired speed in order to prevent the occurrence of a rear-end collision. Furthermore, for a car traveling at high speed in a low traffic volume situation such as the night time, there occurs a situation which is not desirable for the safety and environment, such as compulsion of rapid deceleration caused by a red light of a signal intersection. In such a situation, it is predicted whether a car traveling at high speed will stop at a red light of an intersection, on the basis of the traveling speed of a car and indication schedule data of a signal supplied from the traffic data storage 10, and a distance between the car and the signal intersection supplied from the map database 110. If the car is judged to stop, then a suitable speed as designed with a through band of FIG. 2 or a speed corresponding to deceleration is indicated so that the car may pass through each intersection smoothly.

A concrete example of the control strategy will now be described by referring to FIGS. 7 and 8. FIG. 7 shows an example of a traveling speed change of a car in a range from this side of a tunnel to the tunnel. A broken line in a graph of FIG. 7 represents the behavior of the car, in the case where control information is not supplied to the probe car at all, i.e., in the case where the car travels freely. It is shown that in such a case the driver rapidly decelerates the car consciously near the tunnel because of a visual cause or the like. This sometimes poses a problem in safety or efficiency. On the other hand, a solid line of the graph represents an example of a traveling speed change, in the case where there is provided to a car (probe car) such a control strategy as to indicate a desired speed slightly lower than the current speed so as to gradually lower the speed before the tunnel beforehand, in order to prevent rapid speed lowering before the tunnel from the viewpoint of safety insurance. It is also possible to preset a recommended speed for traveling near the tunnel. When the current speed of a traveling car approaching the tunnel is in this case equal to or less than the recommended speed, the recommended speed is given as a control strategy and increase of the traveling speed of the car is indicated. These control strategies are effective not only in tunnels but also in such roads that drivers consciously lower the traveling speed, such as roads having tollgates or gates, roads on which the visibility is poor because of fog or the like, and roads frozen on road surface.

Figure 8:
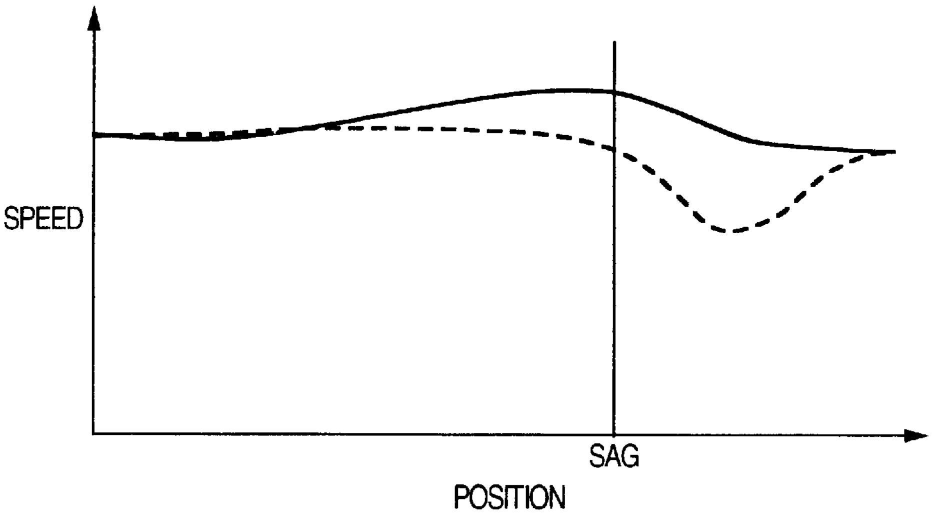
FIG. 8 is a diagram showing a traveling locus of a car passing through a sag.

FIG. 8 shows an example of a traveling speed change of a car in a range from this side of a tunnel to beyond the tunnel. A broken line in a graph of FIG. 8 represents a traveling speed change, in the case where control information is not supplied to the probe car at all, i.e., in the case where the car travels freely. As represented by this graph, the driver rapidly decelerates the car unconsciously at a sag where a down grade is changed to uphill grade. This sometimes poses a problem in safety or efficiency. On the other hand, a solid line of the graph represents an example of a traveling speed change, in the case where there is provided to a car (probe car) such a control strategy as to indicate a desired speed slightly higher than the current speed to the car so as to make the driver ready to accelerate before passing through the sag, in order to prevent rapid speed lowering before the sag from the viewpoint of safety and efficiency insurance. It is also possible to preset a recommended speed for traveling near the sag. Even when the current speed is in this case equal to at least the recommended speed, the recommended speed is given as a control strategy. These control strategies are effective not only in sags but also in places, such as climbing sections, where physically speed lowering necessarily occurs and consequently the traffic volume suddenly lowers, and roads where there is a great risk of a rear-end collision.

The places where these control strategies are applied can be determined by referring to the road shapes, road structures and so on stored in the map database 110. These control strategies may be applied to places known beforehand on the basis of statistical data of past traffic accidents and traffic jams.

Besides the desired speed, the index of the control strategy may be an index relating to the desired speed such as a desired accelerator opening or a desired brake hardness, an index relating to steering operation such as a lane change, or an index having a combination of a desired speed and steering operation such as squeezing between cars A and B at a speed of 60 km/h.

For the purpose of grasping the traveling situation of cars on the basis of data of the traffic data storage 10 and the map database 110 and forming, canceling, or integrating car groups, the car group strategy input section 112 serves to input control information concerning behavior of probe cars which are a part of traveling cars. For example, the car group strategy input section 112 inputs control information for disposing probe cars in suitable positions in traveling cars to form car groups each having a probe car at the head thereof, control information for making a probe car leave a car group or handling the probe car as an ordinary car without giving control orders to cancel a car group, or control information for suitably controlling probe cars of a plurality of car groups to integrate car groups into one car group. In this case as well, the car group strategy input section 112 may select control information from among a plurality of preset control strategies and input it. Or by using a man-machine interface or the like, the user may suitably input a control strategy manually.

Figure 10:
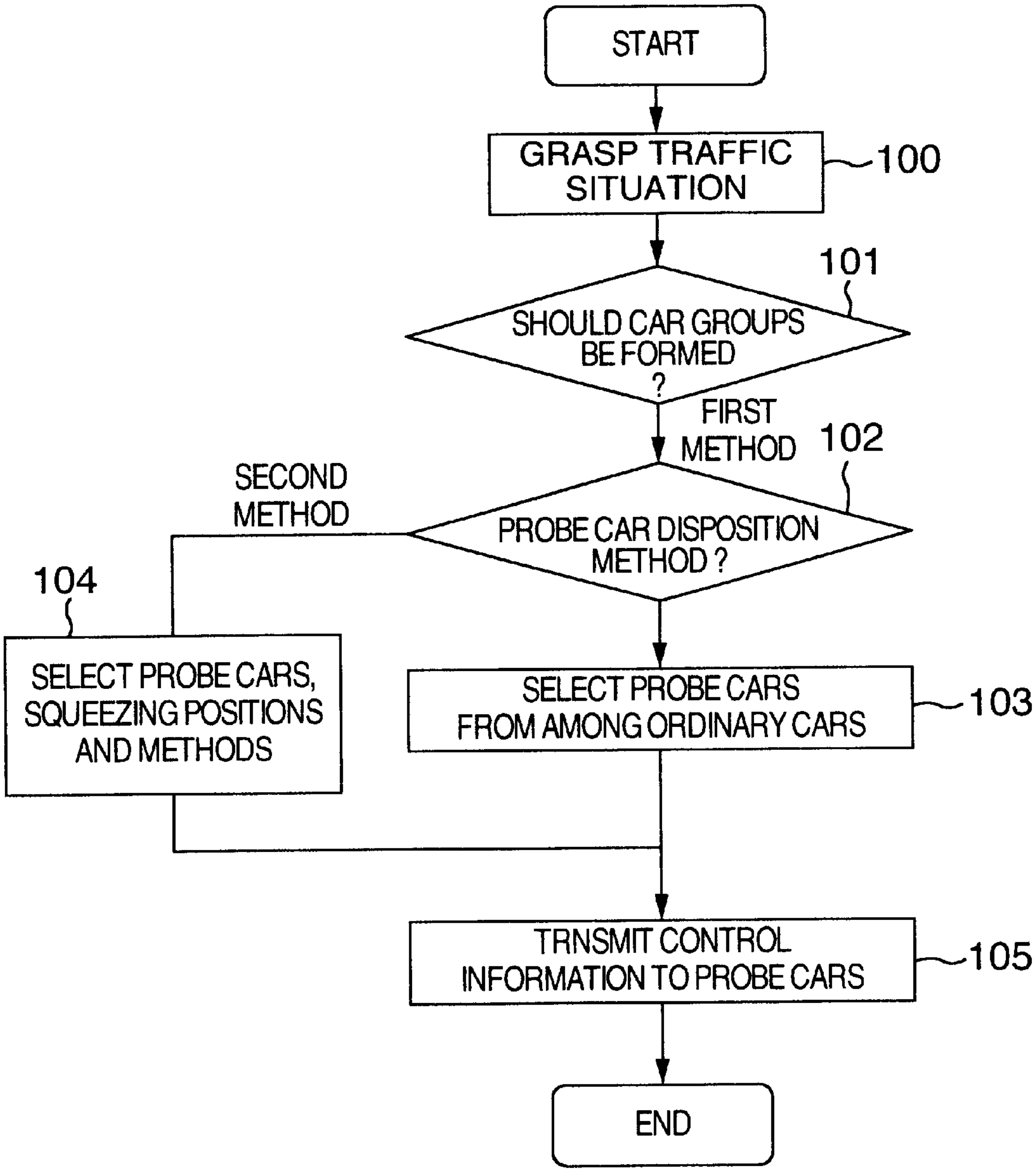
FIG. 10 is a flow chart of processing conducted in the case where car groups are formed.

A concrete method for car group formation, cancel, and integration will now be described by referring to several examples. First, an example of the case where car groups are formed will now be described by referring to a flow chart of FIG. 10.

Figure 9:
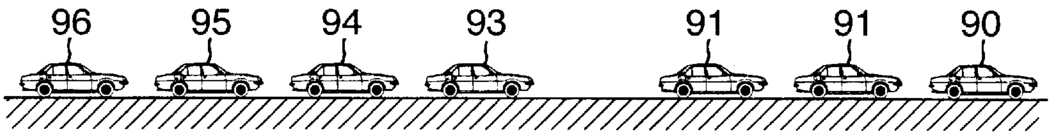
FIG. 9 is a diagram showing a n example of a traveling situation of cars.
Figure 11:
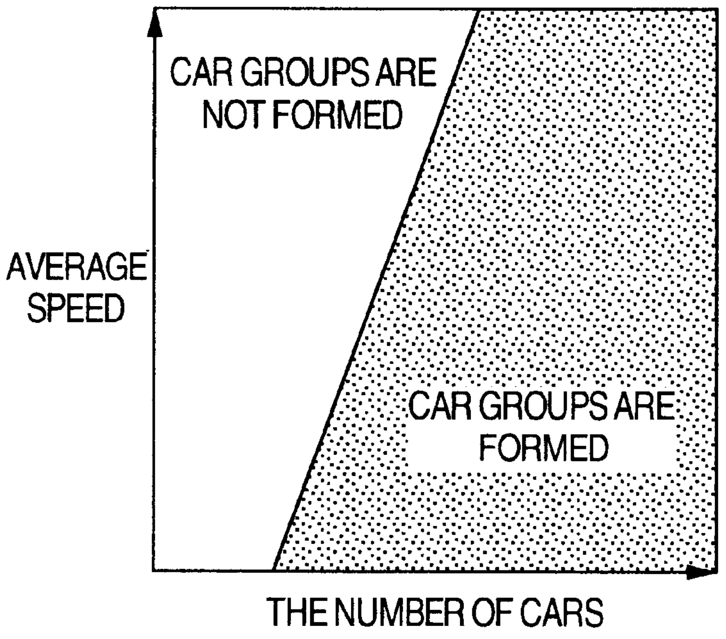
FIG. 11 is a diagram showing an example in the case where a car group forming decision criterion is based on the number of cars and an average speed.
Figure 12:
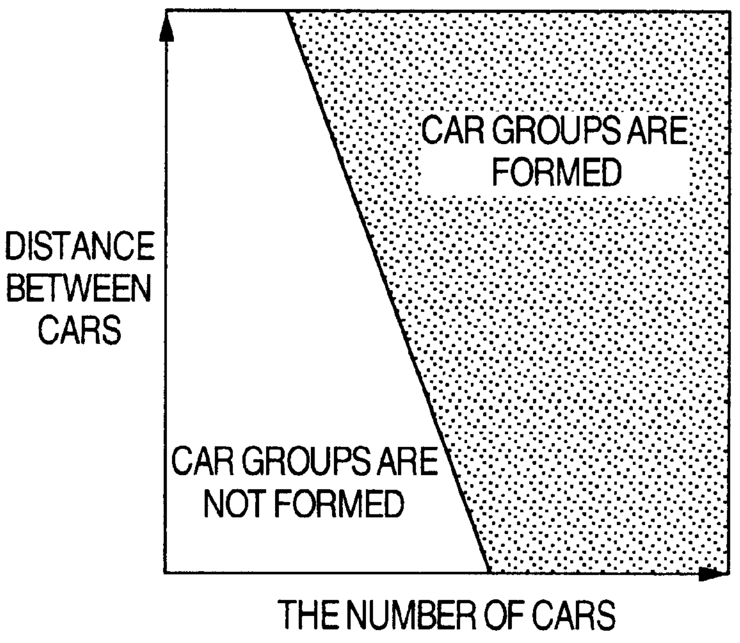
FIG. 12 is a diagram showing an example in the case where a car group forming decision criterion is based on the number of cars and a distance between cars.

FIG. 9 is a diagram showing a traveling situation of cars 90 to 96. The traveling situation of cars is grasped by referring to data of the traffic data storage 10 and the map database 110 at certain time. As a concrete traffic situation, data such as the number of cars traveling on a subject road section, and positions, speeds, car kinds, destinations, and distances from immediately preceding cars of respective cars are used (100). Subsequently, on the basis of a traveling situation such as the number of ordinary cars running in a line grasped by referring to data of all cars in the subject section, it is determined whether car groups should be formed by using probe cars (101). For determining whether car groups should be formed, there can be used, for example, a decision criterion determined on the basis of relations among the number of cars except a probe car (hereafter referred to as ordinary cars) traveling on the subject road, their average speed, their car kinds, and their distances between cars. Concrete examples of the decision criterion are shown in FIGS. 11 and 12. In the case of FIG. 11, it is determined on the basis of the number of ordinary cars and their average speed whether car groups should be formed. In the case of FIG. 12, it is determined on the basis of the number of ordinary cars and their average distance between cars whether car groups should be formed. The example of FIG. 11 means such a decision criterion that the scales of car groups are made large (i.e., small car groups are not formed) in the case where the average speed is large (i.e., cars flow smoothly to some degree). In the same way, the example of FIG. 12 represents such a decision criterion that small car groups are formed if the distances between cars are large and a large car groups are formed if the distances between cars are small. Besides, there are such a criterion that each group is formed of a predetermined number of cars, such a criterion that a plurality of car kinds such as large size and small size are not mixedly present in the same car group, and such a criterion that a car group is not formed if a distance between cars is at least a predetermined value.

Subsequently, in disposing a probe car, one of two methods described hereafter is employed (102). A first method is implemented by selecting suitable cars as probe cars from among traveling cars each having an in-vehicle terminal (103), and transmitting control information to the selected cars via the radio communication means 13 (105). According to an example of control information, the cars selected as the probe cars are changed from ordinary cars to the probe cars, and a suitable desired speed is transmitted to each of them so that succeeding cars may follow each probe car. For example, in the case where two cars 90 and 93 are selected as probe cars from seven ordinary cars shown in FIG. 9, two groups (cars 90 to 92 and cars 93 to 96) having the two cars 90 and 93 as heads thereof are formed. Which cars should be selected as probe cars are determined on the basis of the scheduled number of cars for forming car groups, car kinds, destinations, and the distances between cars, and data of the traffic data storage 10 such as the scheduled phase pattern data of intersection signals.

According to a second method, dedicated cars to be used as probe cars are disposed at a plurality of points of a subject road beforehand. The probe car control apparatus 11 selects probe cars to be squeezed between ordinary cars, and selects positions and methods of squeezing (104). The probe car control apparatus 11 transmits control information to the probe cars as behavior commands via the radio communication means 13 (105). As for an example of the squeezing position and method, it may be, for example, "a car is squeezed between the cars 92 and 93 of FIG. 9 at a speed of 60 km/h." Which cars should be squeezed where are determined on the basis of waiting positions of the probe cars, the scheduled number of cars forming car groups, car kinds, destinations, and the distances between cars, and data of the traffic data storage 10 such as the scheduled phase pattern data of intersection signals. By the way, in the case where many large-sized cars are traveling in a line, braking behavior of each large-sized car is poorer than that of small-sized cars, resulting in an increased risk of dangers sometimes. If the second method of using dedicated probe cars is used as a measure against this and control is conducted so as to squeeze a small-sized probe car in a suitable position in the group of large-sized cars, then the safety is increased.

The above described probe car disposition method may be used in the same way not only in the car group strategy input section 112 but also in the control strategy input section 111.

An example of the case where car groups are canceled will now be described. First, it is now assumed two car groups (cars 90 to 92 and cars 93 to 96) have been formed by the two probe cars 90 and 93 in FIG. 9. Subsequently, control information is transmitted to the probe cars 90 and 93 heading the car groups to be canceled, via the radio communication means 13 so as to make the probe cars 90 and 93 behave not as probe cars but as ordinary cars. As a result, all the cars 90 to 96 become ordinary cars. The cars 90 to 96 travel freely without depending upon the control information. Thus, the car groups are naturally canceled. There may be used such a method as to forcibly cancel car groups by transmitting control information to the probe cars 90 and 93 heading the car groups to be canceled, via the radio communication means 13 so as to make the probe cars 90 and 93 leave the car groups by making, for example, the probe cars 90 and 93 stop on the shoulder of a road.

Finally, an example of the case where a plurality of car groups are integrated will now be described. First, it is now assumed two car groups (cars 90 to 92 and cars 93 to 96) have been formed by the two probe cars 90 and 93 in FIG. 9. Subsequently, control information is transmitted to the probe car 93 heading the subsequent car group which is not the head car group, via the radio communication means 13 so as to make the probe car 93 follow the last car 92 of the head car group to participate in the head car group and so as to change the probe car 93 from a probe car to an ordinary car. In the case where the ordinary cars 93 to 96 of the subsequent car group do not catch up with the head car group and consequently the car groups are not integrated, control information is transmitted to the probe car 90 of the head car group in order to make the probe car 90 lower the desired speed so that the subsequent car group may catch up.

Which of the car group formation, cancel and integration should be conducted is determined by using the scheduled number of cars for forming car groups, car kinds, destinations, and the distances between cars, and data of the traffic data storage 10 such as the indication schedule data of intersection signals. For example, since one probe car and ordinary cars capable of freely traveling are included in a car group, whether the car group can be maintained depends upon the number of cars (scale) belonging to the car group. By conducting the car group formation, cancel or integration on the basis of the scheduled number of cars (predetermined value) forming a car group, therefore, it becomes possible to maintain such a suitable car group scale as to make possible car group control using probe cars. By conducting car group formation, cancel or integration on the basis of indication schedule data of intersection signals, it becomes possible to form car groups so that each car group may not be divided by a red light.

The car group control strategy evaluating and determining section 113 functions to evaluate the propriety of strategy information inputted by the control strategy input section 111 and/or the car group strategy input section 112, and determine strategy information to be transmitted to the probe car 14 via the radio communication means 13.

Figure 13:
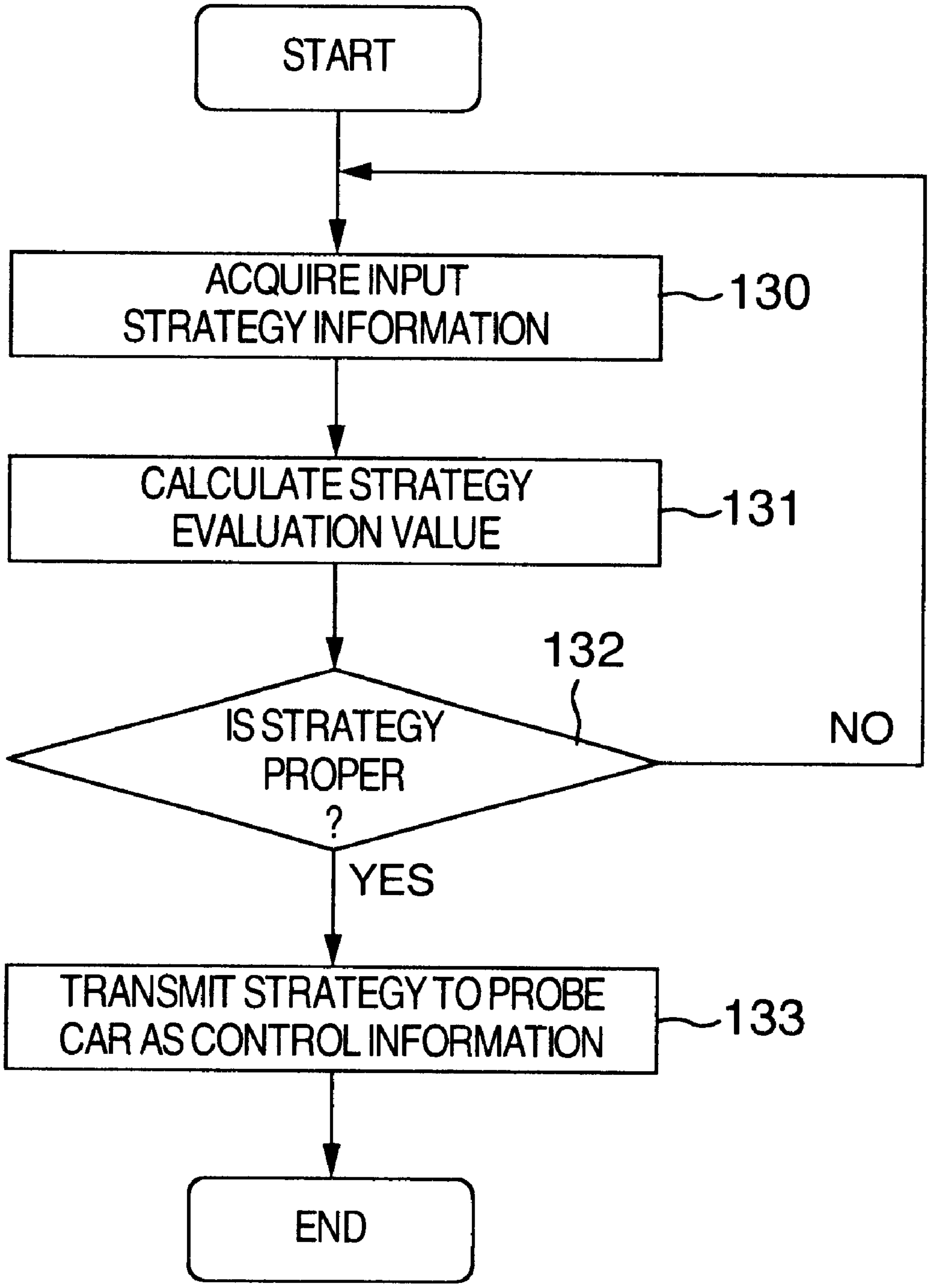
FIG. 13 is a flow chart showing a flow of processing conducted in a car group control strategy evaluating and determining section.

Hereafter, a flow of processing of the car group control strategy evaluating and determining section 113 will be described by referring to a flow chart of FIG. 13. First, control strategy information from the control strategy input section 111 and/or car group strategy information from the car group strategy input section 112 is acquired (130).

In order to evaluate the propriety of the above described inputted strategy information, an evaluation value of the strategy is calculated as hereafter described (131). For example, by defining an evaluation function having the following form from the viewpoint of efficiency, safety and environment beforehand, an evaluation value E is calculated.

$$E = \sum_i f_i(a, b, c, d, \ldots) \tag{1}$$

In the expression (1), i denotes the number of cars to be evaluated, and variables a, b, c, d, . . . denote evaluation indices concerning the efficiency, safety and environment obtained from data of the traffic data storage 10 and the map database 110. As evaluation indices concerning the efficiency, there are travel time (average speed), traffic jam length, the number of times of stop, variation of speed (standard deviation), and so on. As evaluation indices concerning the safety, there are the number of times of rapid deceleration occurrence, the number of times abnormal approach between cars, the number of times of crashes, stability of a traffic flow at the time of following movement (local stability/asymptotic stability), and so on. As evaluation indices concerning the safety, there are exhaust volume of matters determined by the Environmental Pollution Prevention Act and the Air Pollution Control Act, such as hydrocarbon (HC), carbon monoxide (CO), nitrogen oxide (NOx), lead compounds, particulate matters, acoustic power level of road traffic noise, exhaust volume of carbon dioxide, fuel consumption, road traffic vibration, and so on. By summing strategy evaluation values fi derived for respective cars on the basis of these indices, an evaluation value E of strategy information is derived.

For calculating an evaluation value of the inputted strategy information, a method using a tool such as the traffic simulator 12 for reproducing the movement of each car in detail may be adopted, besides the method of calculating the evaluation value in the car group control strategy evaluating and determining section 113 on the basis of the above described evaluation expression. Detailed functions of the traffic simulator 12 will be described later.

Subsequently, it is determined on the basis of the evaluation value E derived by using the above described evaluation function whether the above described input strategy information is proper (132). As a method for determining whether strategy information is proper, there is, for example, a method of presetting a threshold value for the above described evaluation value, comparing the threshold value with the evaluation value, and thereby judging the propriety.

If the strategy information having the evaluation value calculated by using this method is judged to be improper, then processing returns to the processing of the control strategy input section 111 or the car group strategy input section 112, and new strategy information is inputted (130). Until the strategy information is judged to be proper at the step 132, steps 130 to 132 are repeated.

According to a different method for determining whether strategy information is proper, a plurality of strategy information pieces are inputted by the control strategy input section 111 or the car group strategy input section 112 beforehand, and an evaluation value is calculated for each of these inputted strategy information pieces. There may be used such a method as to adopt strategy information that has outputted an optimum evaluation value among the calculated evaluation values. Or there may be used a method of temporarily inputting strategy information as an initial value by using the control strategy input section 111 or the car group strategy input section 112, and obtaining optimum strategy information by using a numerical solution such as the steepest descent method or the Newton method until an optimum value is obtained.

If the inputted strategy information is judged at the step 132 to be proper, then the strategy information is transmitted to the car group control strategy transmission section 114 as control information to be transmitted to the probe car, and the strategy information is transmitted from the car group control strategy transmission section 114 to the probe car 14 via the radio communication means 13 (133).

The car group control strategy transmission section 114 functions to transmit strategy information determined by the car group control strategy evaluating and determining section 113 to the probe car 14 via the radio communication means 13. Concrete hardware may be a communication device using a wire medium or a wireless medium, such as a network card, a modem, a terminal adapter, a dial up router, corresponding to a local area network (LAN). The hardware may be a device having an equivalent function.

The traffic simulator 12 is utilized in the car group control strategy evaluating and determining section 113 to calculate the evaluation value of the input strategy information. By estimating and calculating the movement of each car according to a natural law or the like on the basis of the data of the traffic data storage 10, the traffic simulator 12 reproduces the traffic situation of the subject road. Furthermore, the traffic simulator 12 can conduct simulation to represent how the traffic flow around probe cars are changed by the behavior of the probe cars when the probe cars are controlled according to the inputted strategy information. On the basis of the simulation result, the traffic simulator 12 calculates the evaluation value of the inputted strategy information. After the evaluation value has been calculated, processing similar to that subsequent to the step 132 in the flow chart of FIG. 13 is conducted.

The traffic simulator 12 is effective in the case where it is necessary to conduct strategy evaluation simultaneously on a large number of cars and especially in the case where a road network is evaluated as a whole. Furthermore, the traffic simulator is effective also in that behavior of cars can be visually understood by displaying the simulation result on an indication device such as a display. When it is determined whether a strategy is proper at the step 132 in FIG. 13, therefore, it is also possible for the user to judge subjectively by watching the screen of the indication device.

Figure 14:
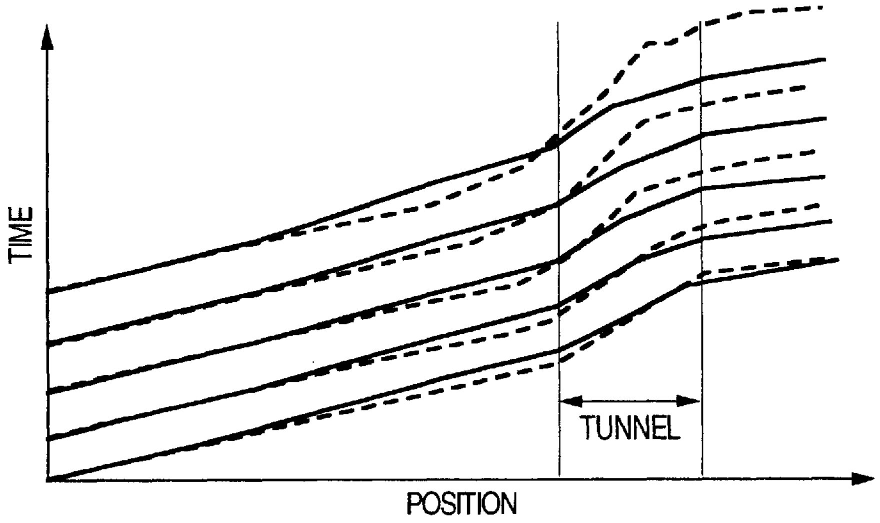
FIG. 14 is a diagram showing an example of reproduction of traveling loci of a car passing through a tunnel obtained by using a traffic simulator.
Figure 15:
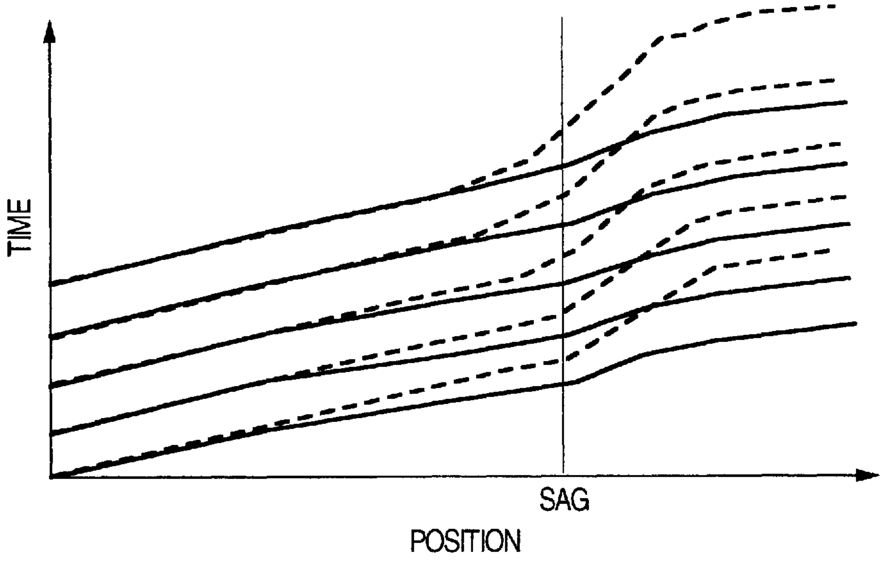
FIG. 15 is a diagram showing an example of reproduction of traveling loci of a car passing through a sag obtained by using a traffic simulator.

It is now assumed that a car group includes five cars and one car located at the head serves as a probe car whereas four remaining cars travel freely. Traveling states of the car group near a tunnel and a sag are reproduced by using the traffic simulator 12. FIGS. 14 and 15 show the reproduced traveling states in a graph form.

In FIG. 14, broken lines represent behavior in the case where control information is not supplied to the probe car located at the head of the car group at all, i.e., in the case where all cars travel freely. Solid lines represent behavior of the car group in the case where control information is supplied to the probe car to indicate such a desired speed that slight deceleration is previously conducted before (on the upper stream of) a tunnel, so as not to conduct rapid deceleration when the car has entered the tunnel, by taking safety into consideration. In the present example, there is only one probe car at the head. Four remaining following cars travel freely. Since the four cars are preceded by the probe car, they follow the probe car while lowering their speeds.

In FIG. 15 as well, broken lines represent behavior in the case where control information is not supplied to the probe car at all, i.e., in the case where all cars travel freely. Solid lines represent behavior of the car group in the case where control information is supplied to the probe car to indicate such a desired speed that slight acceleration is previously conducted before (on the upper stream of) a sag, in order to lighten the deceleration conducted when the car has entered the sag, by taking the safety and efficiency into consideration. In the present example as well, there is only one probe car at the head. Four remaining following cars travel freely. Since the four cars are preceded by the probe car, they follow the probe car while increasing their speeds. As a result, the speed lowering caused by the sag is lightened.

Models handled by the traffic simulator 12 can be divided broadly into two categories: micro models for reproducing detailed behavior of each car as described earlier; and macro models for macroscopically grasping a traffic flow as in fluid models. The traffic simulator 12 in the present invention may use either model, so long as the model is such a model that the above described evaluation value can be calculated. Even a component other than the traffic simulator may be utilized in the same way, so long as the component has such a function as to be capable of calculating the above described evaluation value.

The radio communication means 13 is intermediation means for coupling the in-vehicle terminal of the probe car 14 to the probe car control apparatus 11 and the traffic data storage 10 by using a radio communication technique such as a beacon on a road, or a base station of portable telephone, PHS or FM multiplex broadcasting. In general, beacons are installed on roads. When a car having an in-vehicle terminal passes near a beacon, information communication is conducted in both directions. Beacons are thus used for so-called narrow area communication. Base stations of portable telephone, PHS or FM multiplex broadcasting are installed on buildings, towers, or public telephone booths. When a car having an in-vehicle terminal exists in a radio wave arrival area of a base station, information communication is conducted. The base stations are used for so-called wide area communication. Beacons and base stations are different in application. In the traffic control system using the probe car control method of the present invention, either radio communication means can be utilized.

The probe car 14 is a car having a dedicated in-vehicle terminal. Driving of the probe car 14 is conducted according to the strategy information supplied from the probe car control apparatus 11. Depending upon given strategy information, an ordinary car might become a probe car, and a probe car might become an ordinary car. The in-vehicle terminal receives strategy information from the probe car control apparatus 11 via the radio communication means 13, and utilizes the strategy information by using either of two strategy information reception means.

Figure 16:
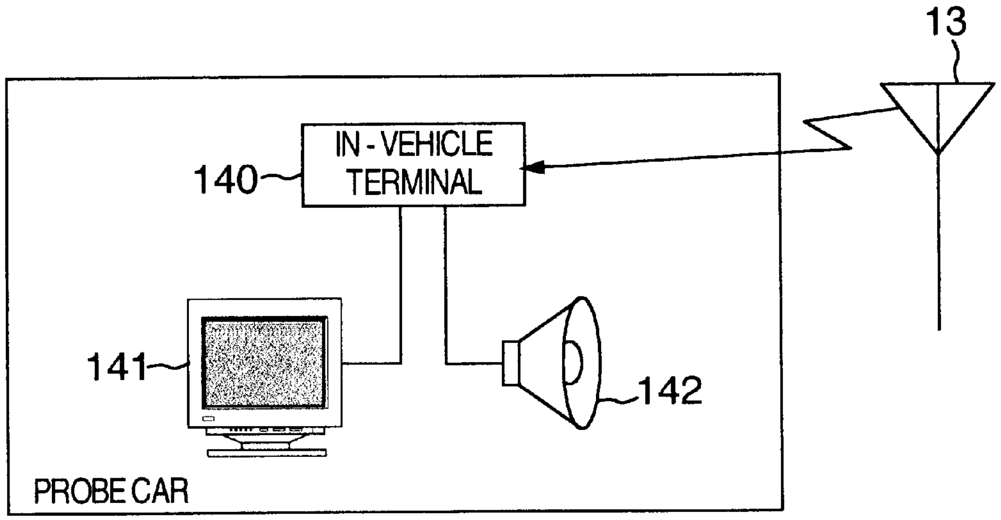
FIG. 16 is a diagram showing an example of a probe car mounting thereon an in-vehicle terminal for receiving strategy information and outputting the strategy information as characters, an icon, or speech.
Figure 21:
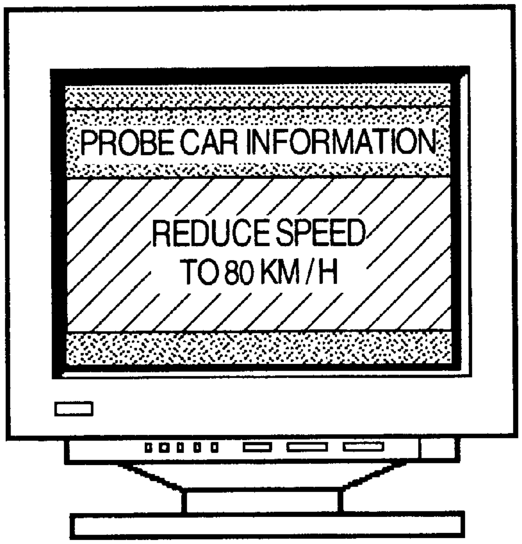
FIG. 21 is a diagram showing an example of the case where strategy information is outputted to a display of a probe car.
Figure 22:
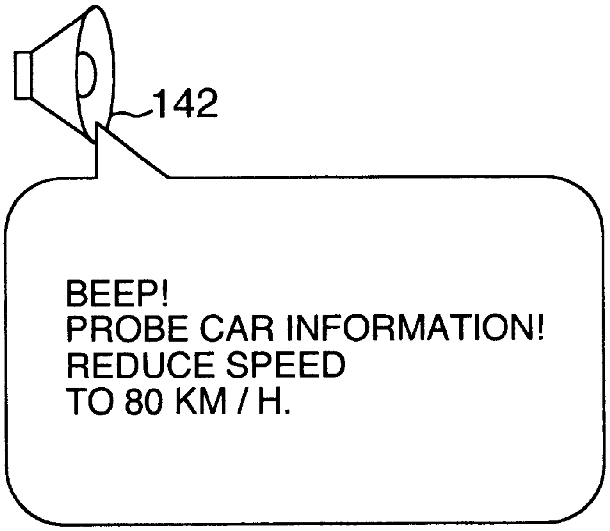
FIG. 22 is a diagram showing an example of the case where strategy information is outputted to a speaker of a probe car.

First strategy information reception means is shown in FIG. 16. Strategy information received from the radio communication means 13 is outputted as character and icon information or voice information by a display 141 or a speaker 142 connected to an in-vehicle terminal 140. The driver drives according to this information. An example of output of the in-vehicle terminal 140 using the display 141 is shown in FIG. 21. An example of output of the in-vehicle terminal 140 using the speaker 142 is shown in FIG. 22. In order to make sure the recognition of the driver, outputting of the display 141 and outputting of the speaker 142 may be conducted simultaneously. In the case of the first strategy information reception means, it is determined at the driver's will whether the driver comply with the received strategy information.

Figure 17:
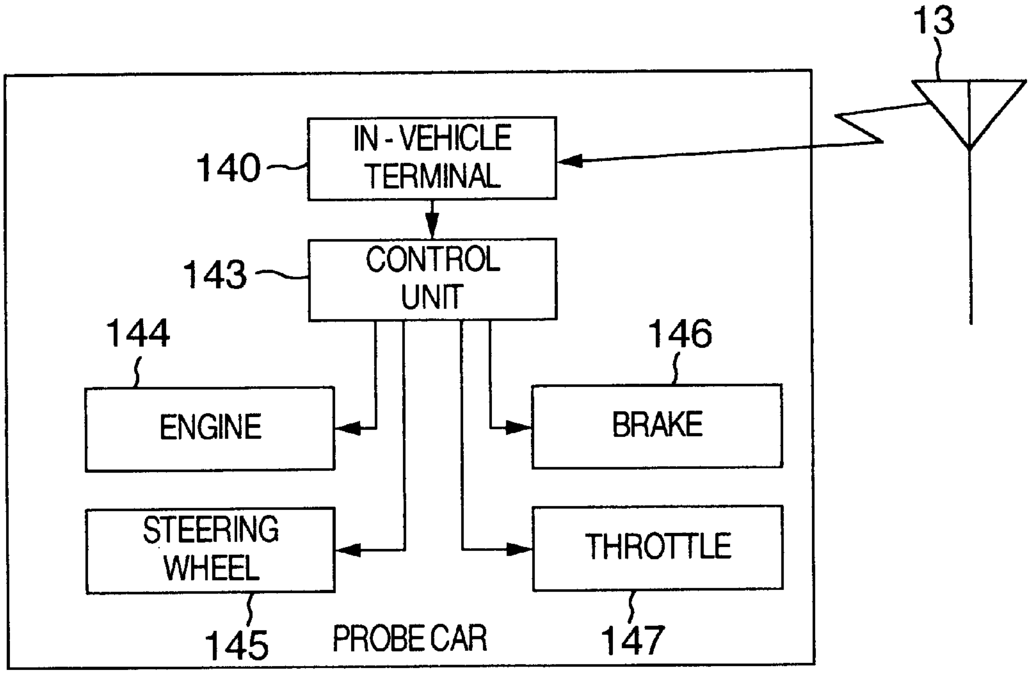
FIG. 17 is a diagram showing an example of a probe car mounting thereon an in-vehicle terminal for receiving strategy information and automatically controlling car behavior.

Second strategy information reception means is shown in FIG. 17. The in-vehicle terminal 140 transmits strategy information received from the radio communication means 13, to a control unit 143 of the car. On the basis of the strategy information, the control unit 143 controls an engine 144, a steering wheel 145, a brake 146, and a throttle 147. In the case of the second strategy reception means, a part or all of the driving operation of the car is automatized. In accordance with the strategy information transmitted from the probe car control apparatus 11, the probe car travels. Therefore, a phenomenon previously evaluated by using the traffic simulator 12 can be reproduced. In other words, the possibility of attaining a previously intended ideal traffic situation is increased.

Figure 23:
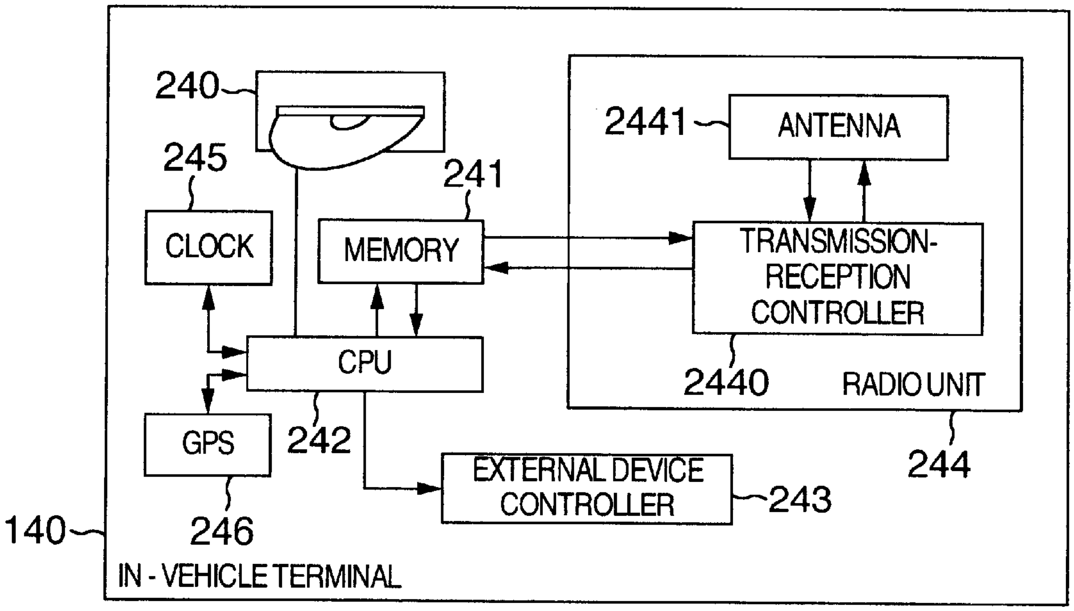
FIG. 23 is a block diagram showing a configuration example of an in-vehicle terminal of a probe car.

The in-vehicle terminal 140 has a function of measuring data of various traffic situations obtained with traveling of the car as shown in FIG. 3 and transmitting the data to the traffic data storage 10 via the radio communication means 13. An example of the in-vehicle terminal 140 is shown in FIG. 23. The in-vehicle terminal 140 includes a disk drive 240, a memory 241, a CPU 242, an external device controller 243, a radio unit 244, a clock 245, and a GPS 246. The radio unit 244 includes a transmission-reception controller 2440 and an antenna 2441. The disk drive 240 is a reading device of a disk, such as a CD-ROM, DVD-ROM, or a hard disk, which mainly stores map data. The memory 241 is a storage used when the CPU 242 conducts various kinds of processing or computation. Furthermore, the memory 241 is also used to store information transmitted and received by the radio unit 244. The CPU 242 is a main processor for conducting various kinds of processing and computation. The external device controller 243 transmits strategy information to the display 141 shown in FIG. 16, the speaker 142 shown in FIG. 16, or the control unit 143 shown in FIG. 17 after converting it into a pertinent format.

The transmission-reception controller 2440 of the radio unit 244 has a function of conducting bilateral information communication with the external radio communication means 13 via the antenna 2441. Information transmitted to the radio communication means 13 is car travel data as shown in FIG. 3. Information received from the radio communication means 13 is strategy information supplied from the probe car control apparatus 11. The clock 245 is used for time management of transmitted and received information, and traveling time measurement. The GPS 246 is an antenna for receiving information from a plurality of GPS satellites going round the earth. By conducting processing on the information, the absolute position of the GPS 246 (car) can be obtained.

Furthermore, if the subsequent following cars are made to recognize the car as the probe car, safer and smoother traveling of the probe car and the following cars can be anticipated. As means for making the following cars recognize the own car as the probe car, the probe car has an electric bulletin board 250 at the back thereof so that it may be watched easily from the following cars. The electric bulletin board 250 indicates that the car is traveling as a probe car. Instead of the electric bulletin board 250, the probe car may have a predetermined probe car mark such as a revolving light, a lamp, or an LED. While the car is an ordinary car, the mark is not presented. When the in-vehicle terminal has received such strategy information as to request the car to behave as the probe car, from the probe car control apparatus 11, the probe car presents the mark. Until the car resigns probe car (i.e., the car changes from a probe car to an ordinary car) in response to the strategy information of the probe car control apparatus 11 or at the probe car driver's will, the probe car continues the presentation. Operation itself of mark presentation or discontinuance thereof is either manual operation of the driver or automatic operation according to strategy information received from the probe car control apparatus 11.

In some cases, the probe car 14 traveling at the head of a car group gets out of the route on the way for the reason that, for example, its destination is different from that of the following cars 15*a* to 15*c*. At that time, information to the effect that the probe car will become an ordinary car and gets out of the car group is transmitted from the in-vehicle terminal to the traffic data storage 10 via the radio communication means 13 for the probe car. Upon receiving the information, the probe car control apparatus 11 may update the adopted control strategy by using a control strategy supplied from the control strategy input section 111 or the car group strategy input section 112, or may update the control strategy by selecting a new probe car.

Figure 24:
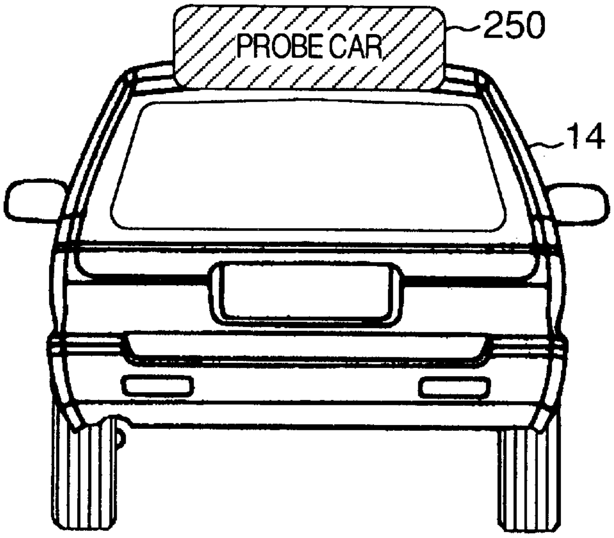
FIG. 24 is a diagram showing a probe car having an electric bulletin board on a back part of a car.

In the case where the probe car becomes an ordinary car and gets out of the car group, a control signal to the effect that the probe car will become an ordinary car is transmitted to the traffic data storage 10 via the in-vehicle terminal. As the operation method, an input through a remote controller or a touch panel which is not illustrated, or a voice input (speech recognition) is used. By this operation, the display on the electric bulletin board shown in FIG. 24 is changed. As for the driver's own driving behavior, the car stops on a road shoulder or goes into a parking lot. Or the car decelerates and travels at such a speed that the following cars pass the car or the following cars do not follow the car. Or the car joins another car group by, for example, following the tail end of a preceding car group. Or the car begins to travel freely at the driver's will and conducts traveling without regard to existing car groups. In this case, the car may behave according to a (last) command of the probe car control apparatus.

Whether a dedicated in-vehicle terminal is mounted or not, each of the following cars 15*a* to 15*c* is an ordinary car which travels freely at its driver's will. Since the way is blocked by the probe car 14 traveling ahead, however, the following cars 15*a* to 15*c* must follow the probe car and travel in many cases so long as they do not pass the probe car. Furthermore, each of the following cars 15 may not be an ordinary car driven by a driver, but may be an automatic driven car which is automatically driven so as to follow the probe car. In that case, it can be anticipated that the smoothness and safety are further improved.

As heretofore described, it becomes possible to suitably control a car group having a probe car at the head thereof or a whole traffic flow including the car group with due regard to the efficiency, safety and environment, by suitably controlling the probe car.

A different embodiment of a probe car control method, a probe car control apparatus, and a traffic control system using the probe car control method will now be described. It is now assumed that a road is a multilane road having two or more lanes for each of the two ways. Even if a probe car is disposed on only one lane in such a multilane road, each of the following cars travels freely by changing its lane. Therefore, it is conceivable that the traffic situation differs remarkably from a result previously predicted in the probe car control apparatus and the efficiency, safety and environment are aggravated. As a measure against such a situation, it is possible to dispose a probe car on every lane and make the probe cars on respective lanes travel in parallel.

Figure 18:
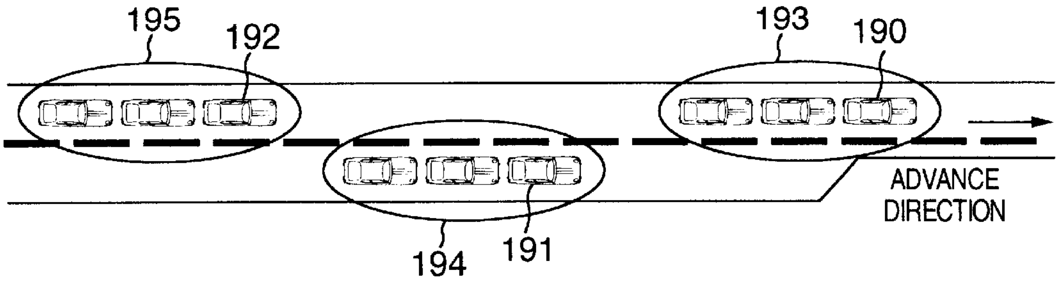
FIG. 18 is a diagram showing a traveling situation of cars on a road reduced in number of lanes.

FIG. 18 shows an example of a travel situation of cars including a probe car in a such a traffic merging place where two lanes per way are reduced to one lane per way. In FIG. 18, numerals 190 to 192 denote probe cars. Numerals 193 to 195 denote car groups each having one of the probe cars at the head thereof. In the place where the number of lanes is reduced (traffic merging place), strategy information is transmitted to the probe cars so that the car groups will travel in cooperation. For example, strategy information is transmitted so that the car groups 193 and 195 traveling on the first lane and the car group 194 traveling on the second lane will alternately enter the lane reducing place. First, therefore, probe cars are selected so as to form car groups each having a suitable length, and car groups 193 to 195 are formed. Orders are given to the probe cars so that a car group located nearer the lane reducing place will speed up and car groups located apart from the lane reducing place will reduce the speed. And control is conducted so as to leave a space between the car group 193 and the car group 195 traveling on the first lane to such a degree that the car group 194 traveling on the second lane can enter the lane reducing place by the time the car group 194 arrives at the place. Before the lane reducing place, control is conducted so that the car groups enter the lane reducing place alternately from the two lanes. By doing so, the safety and efficiency are improved also in ordinary cars other than the probe cars.

As heretofore described, it becomes possible to suitably control car groups each having a probe car at the head thereof or a whole traffic flow including the car groups with due regard to the efficiency, safety and environment, by suitably controlling the probe cars.

A different embodiment of a probe car control method, a probe car control apparatus, and a traffic control system using the probe car control method will now be described. When selecting probe cars and transmitting a strategy, specific cars are not selected, but all cars traveling on the subject section are made subjects. The control strategy input section 111 or the car group strategy input section 112 of the probe car control apparatus 11 supplies input information to the effect that the same car group control strategy is given to all of the cars. The propriety of the input information is evaluated and determined in the car group control strategy evaluating and determining section 113. Then the car group control strategy is transmitted to all of the cars.

By doing so, the car group control strategy information can be given to all cars each of which has a dedicated in-vehicle terminal and is able to become a probe car, among all cars on the subject section. While including ordinary cars which can behave freely, therefore, reproduction of the situation evaluated in the car group control strategy evaluating and determining section 113 is facilitated. As a result, it becomes possible to suitably control the whole traffic flow including the probe cars or car groups with due regard to the efficiency, safety and environment.

Figure 19:
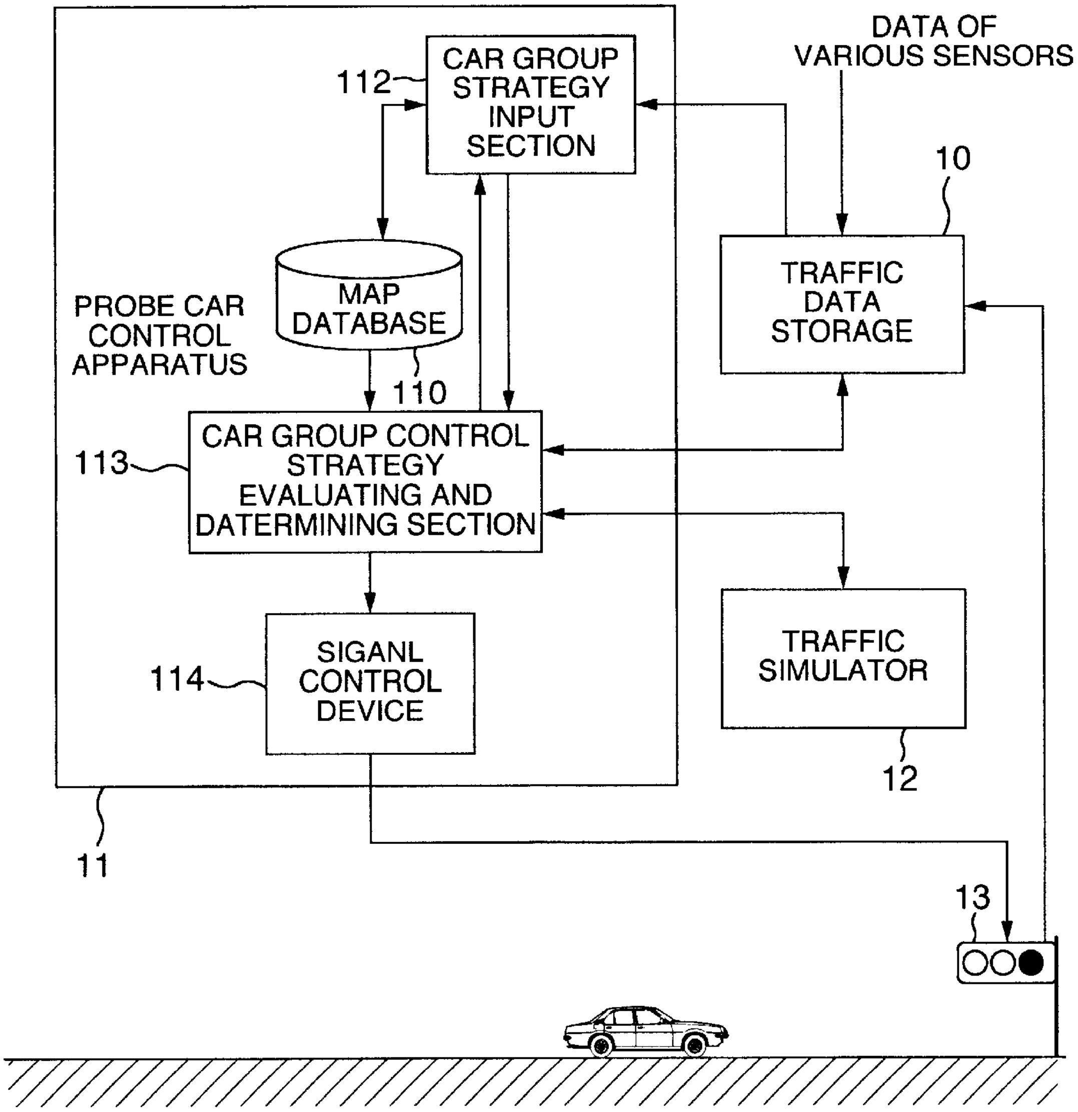
FIG. 19 is a block diagram showing a different embodiment of a traffic control system having a probe car control apparatus according to the present invention.

A different embodiment of a probe car control method, a probe car control apparatus, and a traffic control system using the probe car control method will now be described. FIG. 19 is a block diagram showing a different embodiment of a traffic control system having a probe car control apparatus 11 according to the present invention. The traffic control system of the present embodiment includes a traffic data storage 10, the probe car control apparatus 11 according to the present invention, a traffic simulator 12, a signal control device 16, and a signal 17. On the basis of the real time information concerning car groups, indication of the signal 17 is suitably controlled so as not to divide the current car groups by a red light.

However, an object of the present embodiment is to control the signal rather than a probe car. Accordingly, it is not necessary to transmit strategy information to the probe car. The control strategy input section 111 and the car group control strategy transmission section 114 of the probe car control apparatus 11 shown in FIG. 1 are not necessarily required. The traffic data storage 10 has the same function as that of the embodiment described with reference to FIG. 1. Thus, the traffic data storage 10 functions to store traffic data collected in real time or traffic data n the past as statistical. The probe car control apparatus 11 includes a map database 110, a car group strategy input section 112, and a car group control strategy evaluating and determining section 113. The probe car control apparatus 11 has a function of determining a signal control strategy for suitably controlling indication of the signal 17 on the basis of real time information of the traffic data storage 10 and transmitting the determined strategy to the signal control device 16.

Each of the components included in the probe car control apparatus 11 will now be described in detail. In the same way as the foregoing embodiment, the map database 110 is a database having an electronic road map. The car group strategy input section 112 functions to grasp the traveling situation of cars on the basis of the data of the traffic data storage 10 and the map database 110, and input a suitable signal control strategy (signal indication schedule data as shown in FIG. 6) so as not to divide the current car groups by a red light. When conducting evaluation to determine whether car groups are divided under the current signal control strategy, the car group strategy input section 112 inputs the signal control strategy. As such a signal control strategy as not to divide a car group, there is a signal control strategy which predicts the time when the car group enters an intersection, and prolongs the duration of a green light or corrects an offset so as to indicate a green light at that time.

The car group control strategy evaluating and determining section 113 evaluates the propriety of the signal control strategy inputted by the car group strategy input section 112, and determine whether the signal control strategy of the signal 17 should be updated from the current signal control strategy, or transmits an optimum signal control strategy to the signal control device 16. In an evaluation function for evaluating the propriety of the signal control strategy, there is used an index obtained by quantizing the division of car groups, such as the number of times (percentage) of division of car groups. As evaluation indices used in the evaluation function, the efficiency, safety, or environment may be included as represented by the expression (1). As a method for determining whether strategy information is proper, there is, for example, a method of presetting a threshold value for the evaluation value obtained by the evaluation function, comparing the threshold value with the evaluation value, and thereby judging the propriety.

The traffic simulator 12 is used to calculate the evaluation value of the signal indication schedule data in the car group control strategy evaluating and determining section 113. The traffic simulator 12 has a function similar to that described in the foregoing embodiment. The signal control device 16 has a function of controlling the indication of the signal 17 so as to correspond to the indication schedule data of the signal serving as strategy information determined by the car group control strategy evaluating and determining section 113 of the probe car control apparatus 11. In addition, the signal control device 16 also has a function of transmitting the indication schedule data to the signal. The signal 17 has lights such as a green light, a red light, a yellow light, and an arrow light. The signal 17 has a function of receiving the indication schedule data from the signal control device 16, and turning on, turning off or flashing lights in response to the indication schedule data.

Figure 20:
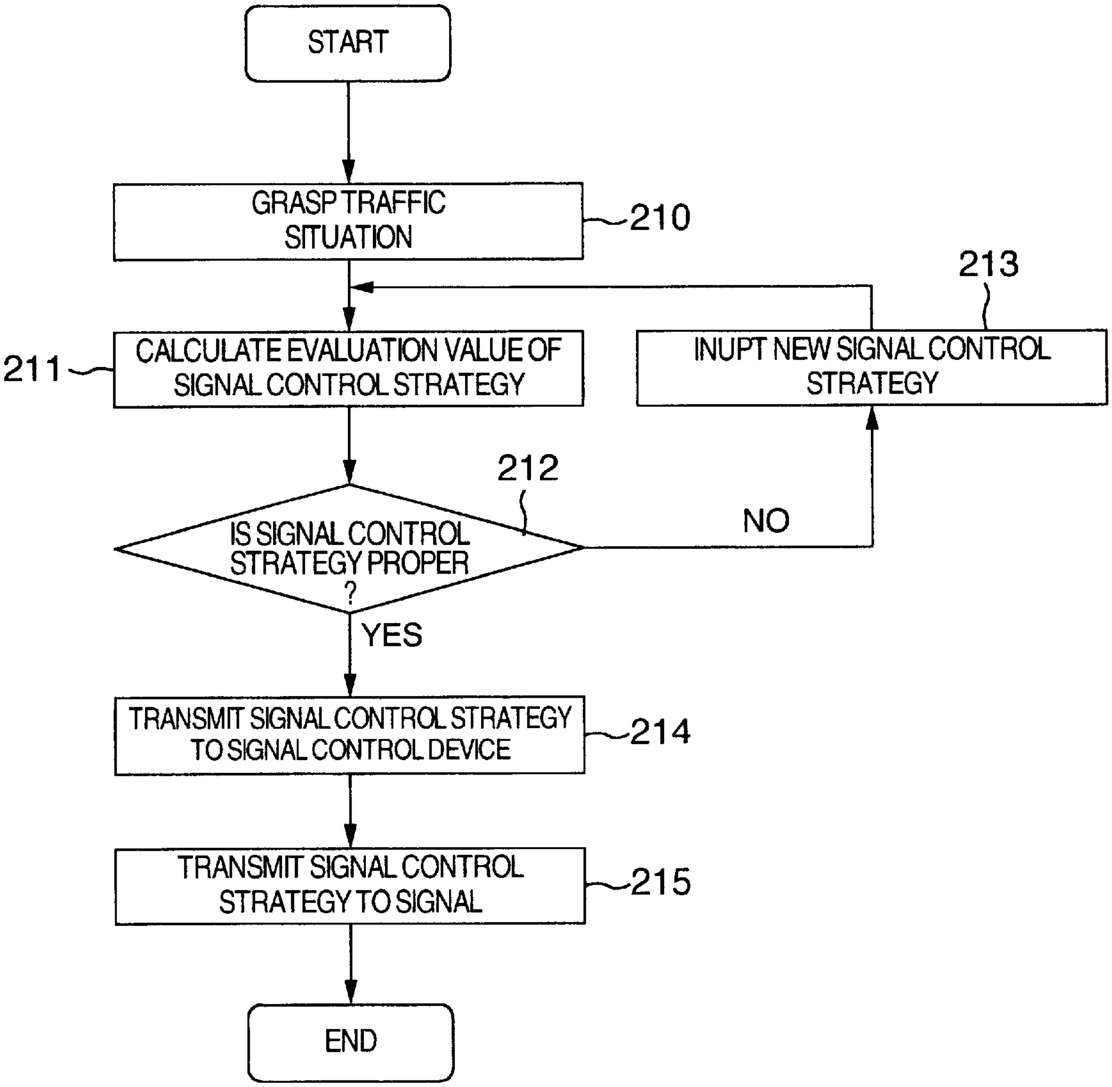
FIG. 20 is a flow chart of processing for controlling a signal so as not to divide a car group by a red light.

Concrete processing of the present embodiment will now be described by referring to a flow chart of FIG. 20 and taking an example. First, the traveling situation is grasped by referring to data of the traffic data storage 10 and the map database 110 at certain time (210). Concretely, data such as the number of cars traveling on a subject road section, and positions, speeds, car kinds, destinations, and distances from immediately preceding cars of respective cars, and the current signal indication schedule data are obtained. The current traffic situation is reproduced by the traffic simulator 12 on the basis of the data, and an evaluation value of the current signal control strategy is calculated (211). By comparing the evaluation value of the signal control strategy with a predetermined threshold value, it is determined whether the signal control strategy is proper (212). If the signal control strategy evaluated at the step 212 is judged to be improper, then a new signal control strategy is inputted (213). Until the signal control strategy is judged to be proper at the step 212, steps 211 to 213 are repeated. If the signal control strategy is judged at the step 212 to be proper, then the signal control strategy judged to be proper is transmitted to the signal control device 16 (214). The signal control device 16 transmits the signal control strategy to the signal 17. The signal 17 functions in accordance with the received signal control strategy (215).

By the processing heretofore described, it becomes possible to conduct suitable signal control so as not to divide the current car group by a red light. In the case where strategy information is already supplied to the probe car and the cars are traveling, the necessity for reconsideration of the strategy information, such as re-inputting and re-evaluation of the control strategy and the car group strategy is reduced.

An operational form of a traffic control system using the probe car control method of the present invention will now be described. It is expected that the rate of propagation of the in-vehicle terminal is not high, in an initial operational stage of the present system. In the initial operational stage, therefore, cars which can become probe cars are limited to some cars, and ordinary cars having no in-vehicle terminals and probe cars are mixedly present on the same lane. As the rate of propagation of the in-vehicle terminal becomes higher, the amount of data collected in the traffic data storage becomes large, the traffic situation can be grasped more accurately, and the control effect of the present system is also increased. Therefore, a measure for prompting the spread of the in-vehicle terminal to drivers becomes necessary. On the other hand, from the viewpoint of drivers of probe cars, they only contribute to mitigation of the psychological burden of the following ordinary drivers, and improvement of the efficiency, safety and environment of the traffic flow as a whole. The drivers of probe cars must travel in accordance with the above described control strategy information. Thus, few advantages are offered to the drivers of probe cars.

For prompting the spread of the in-vehicle terminal and making the operation of the present system more effective, therefore, there is conceivable such a measure as to give some incentive to drivers of cars which have become probe cars. As concrete examples of the incentive, there can be mentioned cash payment (including electronic payment), discounts of charges for using toll roads, and free offers of information services such as traffic information, depending upon the degree of contribution made by becoming probe cars. As a concrete example of quantizing the degree of contribution made as a probe car, a degree of contribution Ec represented by the following expression can be mentioned. On the basis of the accumulated time and accumulated number of times of behavior of a car as a probe car, and the evaluation value according to the expression (1), an evaluation value E1 in the case where the car does not become a probe car is compared with an evaluation value E2 in the case where the car has become a probe car by using the traffic simulator 12.

$$Ec = \alpha \sum_j (E_2(j) - E_1(j)) \tag{2}$$

In the expression (2), α is a factor and j is the number of times of behavior as a probe car. The following relation is satisfied.

$$E_2(j) - E_1(j) > 0 \tag{3}$$

For paying the above described incentive, some income must be obtained. An individual, an organization such as a corporation, a road manager, or a country which benefits from the probe car can bear the income. As a method for quantizing the amount to be borne as well, a calculation method similar to that of the degree of contribution can be used.

By the measure heretofore described, the spread of the in-vehicle terminal can be prompted. As a result, the traffic situation can be grasped more accurately. In addition, by more suitable probe car control, the whole traffic flow can be controlled more suitably with due regard to the efficiency, safety and environment.

According to the present invention, traveling cars can be controlled with due regard to the efficiency, safety and environment even in simple road portions other than signal intersections, by using probe cars and suitably controlling the probe cars on the basis of traffic data or the map database. In addition, it can be achieved to provide a probe car control method, and apparatus, which can easily implement it without depending upon the automatic driving control technique, and a storage medium storing a program for executing the method.

It can also be achieved to provide a traffic control system for controlling car groups each having a probe car at the head thereof or a whole traffic flow including the car groups, by suitably controlling probe cars with the probe car control method or probe car control apparatus.

It can also be achieved to conduct signal control so as not to divide a car group having a probe at the head thereof by a red light.

It can also be achieved to provide such an operational form of a traffic control system that some incentive is given to drivers of probe cars depending upon the degree of contribution, and persons who benefit from the probe cars bear the expense.

What is claimed is:

1. A traffic control system comprising:

a traffic data storage for collecting and storing traffic data in real time;

a probe car control apparatus for controlling behavior of cars, comprising:

a road map database;

a car group control strategy input section for inputting a control strategy concerning behavior of a probe car or a car group strategy concerning behavior of a car group having a probe car at the head thereof, based on a road map database or traffic data collected in real time;

a car group control strategy evaluating and determining section for evaluating propriety of the strategy and determining a proper strategy; and a car group control strategy transmission section for transmitting probe car control instructions of the proper strategy to the probe car; and a radio communication section serving as intermediation means for coupling an in-vehicle terminal, the probe car control apparatus, and the traffic data storage, or an intersection signal by using radio communication, wherein a car group having a probe car at the head thereof or a whole traffic flow including the car group is controlled by controlling a probe car having the in-vehicle terminal.

2. A probe car control apparatus for controlling behavior of cars, comprising:

a road map database;

a car group control strategy input section for inputting a control strategy concerning behavior of a probe car and/or a car group strategy concerning behavior of a car group having a probe car at the head thereof, based on a road map database or traffic data collected in real time;

a car group control strategy evaluating and determining section for evaluating propriety of the strategy and determining a proper strategy; and a car group control strategy transmission section for transmitting probe car control instructions of the proper strategy to the probe car, wherein the car group strategy of the probe car inputted by the car group control strategy input section is forming car groups by disposing probe cars in suitable positions based on traffic data; canceling a car group by making a probe car leave a car group or making a probe car an ordinary car; or integrating car groups into one car group by controlling probe cars leading a plurality of car groups.

3. A probe car control apparatus according to claim 2, wherein a method for disposing probe cars in the control strategy or car group strategy of probe cars inputted by the car group control strategy input section is:

a method of selecting suitable cars as probe cars from among traveling ordinary cars, based on traffic data; or a method of previously disposing dedicated cars to be used as probe cars, selecting probe cars to be squeezed between ordinary cars, and selecting positions and methods of squeezing.

4. A probe car control apparatus for controlling behavior of cars, comprising:

a road map database;

a car group control strategy input section for inputting a control strategy concerning behavior of a probe car and/or a car group strategy concerning behavior of a car group having a probe car at the head thereof, based on a road map database or traffic data collected in real time;

a car group control strategy evaluating and determining section for evaluating propriety of the strategy and determining a proper strategy; and a car group control strategy transmission section for transmitting probe car control instructions of the proper strategy to the probe car, wherein indices used in an evaluation function for evaluating propriety of the strategy in the car group control strategy evaluating and determining section comprise:

travel time (average speed), traffic jam length, a number of times of stop, and variation of speed (standard deviation), serving as indices concerning efficiency;

a number of times of rapid deceleration occurrence, a number of times abnormal approach between cars, a number of times of crashes, and stability of a traffic flow at time of following movement (local stability/asymptotic stability), serving as indices concerning safety; or exhaust volume of matters determined by the Environmental Pollution Prevention Act and the Air Pollution Control Act, including at least one of hydrocarbon (HC), carbon monoxide (CO), nitrogen oxide (NOx), lead compounds, particulate matters, acoustic power level of road traffic noise, exhaust volume of carbon dioxide, fuel consumption, and road traffic vibration, serving as indices concerning environment.

5. A probe car control apparatus for controlling an intersection signal, comprising:

a map database;

a car group strategy input section for inputting signal indication schedule data so as not to divide a car group having a probe car at the head thereof by a red light, based on the database or traffic data collected in real time; and a car group control strategy evaluating and determining section for evaluating propriety of the signal indication schedule data and determining proper signal indication schedule data.

6. A probe car control apparatus according to claim 5, wherein the car group control strategy evaluating and determining section comprises a traffic simulator for evaluating propriety of the strategy.

7. A probe car control apparatus according to claim 5, wherein the traffic data comprises:

car traveling data transmitted from an in-vehicle terminal having a transmission function via radio communication means;

fixed point passing traffic data measured by a car sensor on a road; and road image processing data measured by an image sensor; or indication schedule data of intersection signals.

8. A traffic control system comprising:

a traffic data storage for collecting and storing traffic data in real time;

a probe car control apparatus according to claim 1; and a radio communication section serving as intermediation means for coupling an in-vehicle terminal, the probe car control apparatus, and the traffic data storage, or an intersection signal by using radio communication, wherein a car group having a probe car at the head thereof or a whole traffic flow including the car group is controlled by controlling a probe car having the in-vehicle terminal.

9. A traffic control system according to claim 8, wherein the car group control strategy evaluating and determining section comprises a traffic simulator for evaluating propriety of the strategy, and derives a degree of contribution of a driver of a probe car based on a difference of evaluation values derived by the traffic simulator.

10. A traffic control system comprising:

a traffic data storage for collecting and storing traffic data in real time;

a probe car control apparatus according to claim 5;

a signal control device for controlling indication of a signal; and a signal, wherein a car group having a probe car at the head thereof or a whole traffic flow including the car group is controlled by controlling an intersection signal so as not to divide a car group having a probe car at the head thereof by a red light.

* * * * *